(12) United States Patent
Rivers, Jr. et al.

(10) Patent No.: US 8,521,599 B2
(45) Date of Patent: Aug. 27, 2013

(54) CHARGING SYSTEM, KIOSK, AND METHOD OF RESERVING A POWER CHARGING DEVICE AND SUPPLYING CURRENT TO A POWER STORAGE DEVICE

(75) Inventors: Cecil Rivers, Jr., West Hartford, CT (US); Radoslaw Narel, Kensington, CT (US); Marvin Herville Green, Waterbury, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/284,575

(22) Filed: Oct. 28, 2011

(65) Prior Publication Data
US 2013/0110653 A1 May 2, 2013

(51) Int. Cl.
*G06Q 20/00* (2012.01)
*H02J 7/14* (2006.01)

(52) U.S. Cl.
USPC ............................................. 705/16; 320/109

(58) Field of Classification Search
USPC ...................... 705/16, 30; 320/109
See application file for complete search history.

(56) References Cited

U.S. PATENT DOCUMENTS

| | | | |
|---|---|---|---|
| 5,732,812 A * | 3/1998 | Grainger et al. | 194/217 |
| 6,314,169 B1 | 11/2001 | Schelberg, Jr. et al. | |
| 7,984,852 B2 | 7/2011 | Outwater | |
| 8,294,420 B2 * | 10/2012 | Kocher | 320/109 |
| 2007/0245351 A1 * | 10/2007 | Sussman et al. | 718/104 |
| 2009/0021213 A1 * | 1/2009 | Johnson | 320/109 |
| 2010/0161482 A1 * | 6/2010 | Littrell | 705/40 |
| 2010/0274690 A1 * | 10/2010 | Tate, Jr. | 705/30 |
| 2011/0035261 A1 | 2/2011 | Handler | |
| 2011/0074350 A1 * | 3/2011 | Kocher | 320/109 |
| 2011/0093314 A1 | 4/2011 | Redmann et al. | |
| 2011/0145141 A1 * | 6/2011 | Blain | 705/39 |
| 2011/0191265 A1 | 8/2011 | Lowenthal et al. | |
| 2012/0130891 A1 * | 5/2012 | Bogaard et al. | 705/40 |
| 2012/0191524 A1 * | 7/2012 | Ambrosio et al. | 705/14.23 |
| 2012/0271723 A1 * | 10/2012 | Penilla et al. | 705/16 |
| 2012/0319651 A1 * | 12/2012 | Outwater et al. | 320/109 |
| 2012/0331301 A1 * | 12/2012 | Outwater et al. | 713/176 |

OTHER PUBLICATIONS

UC Riverside Students and Faculty 'Plug in' to 21st Century Transportation Concept. PR Newswire, p. 1446. Mar. 24, 1999.*

* cited by examiner

*Primary Examiner* — Scott Zare
(74) *Attorney, Agent, or Firm* — Global Patent Operation (57) ABSTRACT

A charging system for use in supplying current to a power storage device includes a charging device configured to be coupled to the power storage device to perform a charging operation and a kiosk coupled to the charging device. The kiosk is configured to receive pricing data for the charging operation from the charging device, display the pricing data, enable the pricing data to be accepted, and authorize the charging device to initiate the charging operation if the pricing data is accepted.

27 Claims, 4 Drawing Sheets

CHARGING SYSTEM, KIOSK, AND METHOD OF RESERVING A POWER CHARGING DEVICE AND SUPPLYING CURRENT TO A POWER STORAGE DEVICE

BACKGROUND OF THE INVENTION

The present application relates generally to charging devices and, more particularly, to a charging system, a kiosk, and a method of supplying current to a power storage device.

As electric vehicles and/or hybrid electric vehicles have gained popularity, an associated need to manage delivery of electrical energy to such vehicles has increased. In addition, a need to provide safe and efficient charging devices or stations has been created by the increased use of such vehicles.

At least some known charging stations include a power cable or other conductor that may be removably coupled to the electric vehicle. The charging stations receive electricity from an electric utility distribution network or another electricity source, and deliver electricity to the electric vehicle through the power cable.

A plurality of charging stations may be positioned within a common location, such as a parking lot or a parking garage. Such charging stations may charge a user for the cost of electricity delivered to an electric vehicle by billing the cost to one or more accounts of the user. However, in such a situation, each charging station may require a separate connection to a payment processor to reconcile and/or provide billing services for the user's accounts.

In addition, a user may not know which, if any, of the charging stations are available to charge the electric vehicle. For example, one or more charging stations may be out of service and/or reserved for use with another electric vehicle. If a charging station that the user wants to use is unavailable, the user may have to travel to other locations within the parking lot or garage to determine if other charging stations are available.

BRIEF DESCRIPTION OF THE INVENTION

In one embodiment, a charging system for use in supplying current to a power storage device is provided that includes a charging device configured to be coupled to the power storage device to perform a charging operation and a kiosk coupled to the charging device. The kiosk is configured to receive pricing data for the charging operation from the charging device, display the pricing data, enable the pricing data to be accepted, and authorize the charging device to initiate the charging operation if the pricing data is accepted.

In another embodiment, a kiosk for use with a charging system including a charging device is provided. The kiosk includes a processor programmed to receive, from the charging device, pricing data for a charging operation, and to display the pricing data. The processor is also programmed to enable the pricing data to be accepted and to authorize the charging device to initiate the charging operation if the pricing data is accepted.

In yet another embodiment, a method of supplying current to a power storage device is provided that includes receiving, from a charging device, pricing data for a charging operation and displaying the pricing data. The method also includes enabling the pricing data to be accepted, and authorizing the charging device to initiate the charging operation if the pricing data is accepted.

DETAILED DESCRIPTION OF THE INVENTION

As described herein, a charging system includes a kiosk, a plurality of charging devices, a payment processing system, and a server. The kiosk determines which charging devices are available to perform a charging operation on a power storage device and displays a list of the available charging devices to a user. The kiosk also displays pricing data for each charging device and enables the user to select a charging device to perform the charging operation. The user enters payment information into the kiosk, and the kiosk transmits the payment information to the payment processing system to preapprove payment for the charging operation or to prepay for the charging operation. In one embodiment, the user may select an amount of money to be used for the charging operation such that the charging operation terminates when the charging operation cost reaches the amount of money selected by the user. The kiosk transmits a signal to the charging device to initiate the charging operation if the payment is approved or preapproved. The charging device supplies energy (e.g., electrical current) to the power storage device and notifies the kiosk when the charging operation is terminated (e.g., once the charging operation completes and/or is otherwise stopped). The charging device also transmits charging data to the kiosk, including a cost of the energy supplied to the power storage device or a duration of the charging operation. The kiosk transmits the cost of the energy supplied to the payment processing system for billing the user. Accordingly, as described herein, a user may quickly and efficiently determine which charging devices are available to perform a charging operation and may determine the expected pricing of a charging operation that each charging device may perform.

In some embodiments, the term "electric vehicle" refers generally to a vehicle that includes one or more electric motors. Energy used by electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. A hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
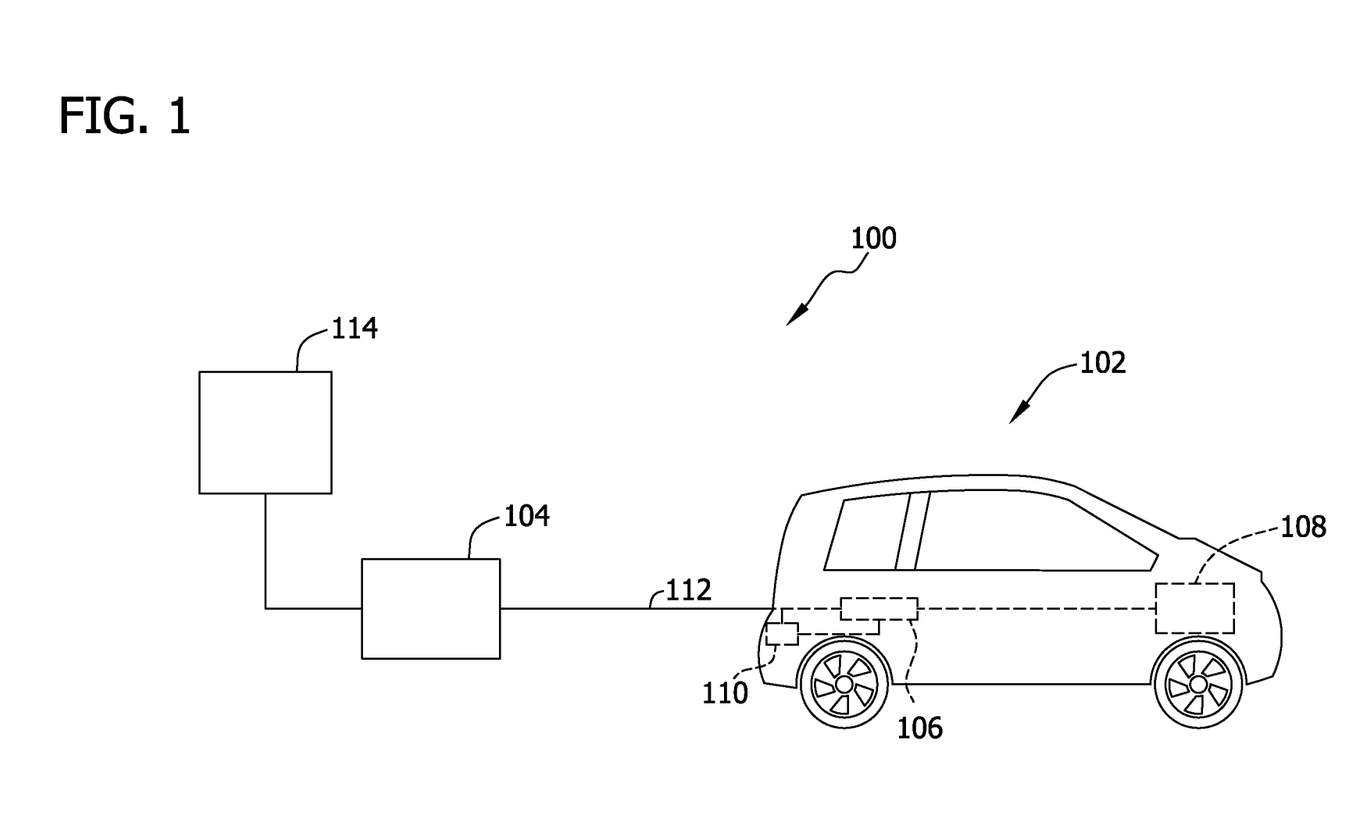
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. Electric vehicle 102 includes at least one power storage device 106, such as a battery and/or any other storage device, coupled to a motor 108. In an exemplary embodiment, electric vehicle 102 also includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown) and/or by inductive coupling such that no conduit 112 is used. In an exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. In an exemplary embodiment, charging device 104 is coupled to an electric power source 114, such as a power grid of an electric utility company, a generator, a battery, and/or any other device or system that provides electricity to charging device 104.

In an exemplary embodiment, vehicle controller 110 includes at least one processor and at least one memory device. The processor includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory device includes a computer readable storage medium, such as, without limitation, random access memory (RAM), flash memory, a hard disk drive, a solid state drive, a diskette, a flash drive, a compact disc, a digital video disc, and/or any suitable memory device that enables the processor to store, retrieve, and/or execute instructions and/or data.

During operation, in an exemplary embodiment, a user couples power storage device 106 to charging device 104 with power conduit 112. Charging device 104 is configured to communicate with a remote device, such as a kiosk (not shown in FIG. 1), to authenticate the user, to process the payment information, and/or to approve or authorize a delivery of power to power storage device 106. If charging device 104 receives a signal from the remote device that indicates approval or authorization to deliver power to power storage device 106, charging device 104 receives power from electric power source 114 and provides the power to power storage device 106 through power conduit 112. Charging device 104 communicates with vehicle controller 110 wirelessly, through power conduit 112, and/or through any other conduit, to control and/or to monitor the delivery of power to power storage device 106. For example, vehicle controller 110 transmits signals to charging device 104 indicating a charge level of power storage device 106 and/or a desired amount and/or rate of power to be provided by charging device 104. In addition, charging device 104 transmits signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
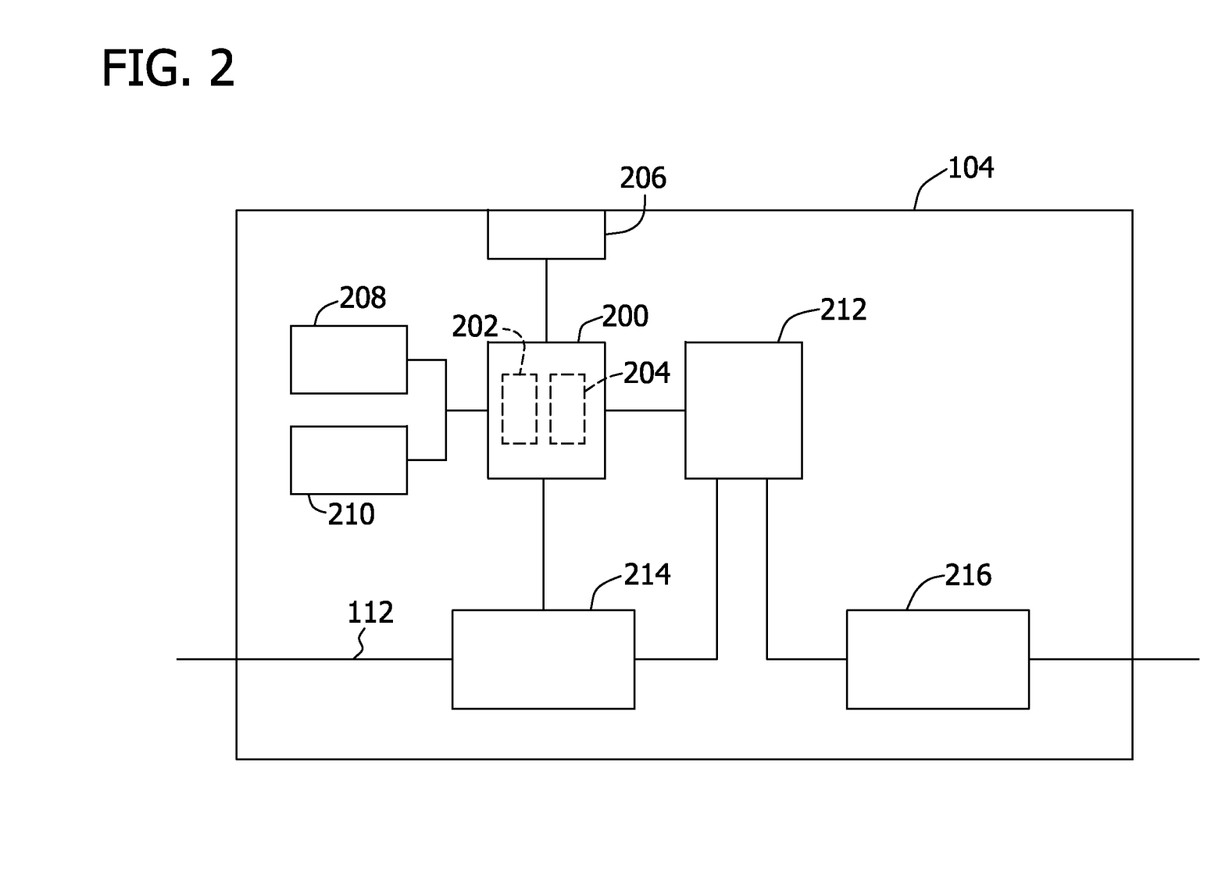
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user input device 210, to a meter 212, and to a current control device 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 204 includes a computer readable storage medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system. In an exemplary embodiment, network interface 206 communicates with remote devices or systems using any suitable data conduit, such as an Ethernet cable, a Recommended Standard (RS) 485 compliant cable, and/or any other data conduit that enables charging device 104 to function as described herein. Alternatively, network interface 206 communicates wirelessly with one or more remote devices or systems using any suitable wireless protocol.

In an exemplary embodiment, display 208 includes a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In an exemplary embodiment, a charging status of power storage device 106 (shown in FIG. 1), a status of communication between charging device 104 and a remote device, such as a kiosk (not shown in FIG. 2), and/or any other information may be displayed to a user on display 208.

User input device 210 includes, without limitation, a keyboard, a keypad, a touch-sensitive screen, a scroll wheel, a pointing device, a barcode reader, a magnetic card reader, a radio frequency identification (RFID) card reader, a contactless credit card reader, a near field communication (NFC) device reader, an audio input device employing speech-recognition software, and/or any suitable device that enables a user to input data into charging device 104 and/or to retrieve data from charging device 104.

In an exemplary embodiment, current control device 214 is coupled to power conduit 112 and to meter 212. In an exemplary embodiment, current control device 214 is a contactor 214 coupled to, and controlled by, controller 200. In an exemplary embodiment, controller 200 operates, or opens contactor 214 to interrupt the current flowing through power conduit 112 such that power storage device 106 is electrically disconnected from electric power source 114 (shown in FIG. 1). Controller 200 closes contactor 214 to enable current to flow through power conduit 112 such that power storage device 106 is electrically connected to electric power source 114.

Meter 212 is coupled to power conduit 112 and to controller 200 for use in measuring and/or calculating the current, voltage, and/or power provided from electric power source 114 to power storage device 106. Meter 212 transmits data representative of the measured current, voltage, and/or power to controller 200.

In an exemplary embodiment, a current protection device 216 is coupled to meter 212 and to electric power source 114. Current protection device 216 electrically isolates or disconnects charging device 104 from electric power source 114 if the current received from electric power source 114 exceeds a predetermined threshold or current limit. In an exemplary embodiment, current protection device 216 is a circuit breaker. Alternatively, current protection device 216 may be a fuse, a relay, and/or any other device that enables current protection device 216 to function as described herein.

Figure 3:
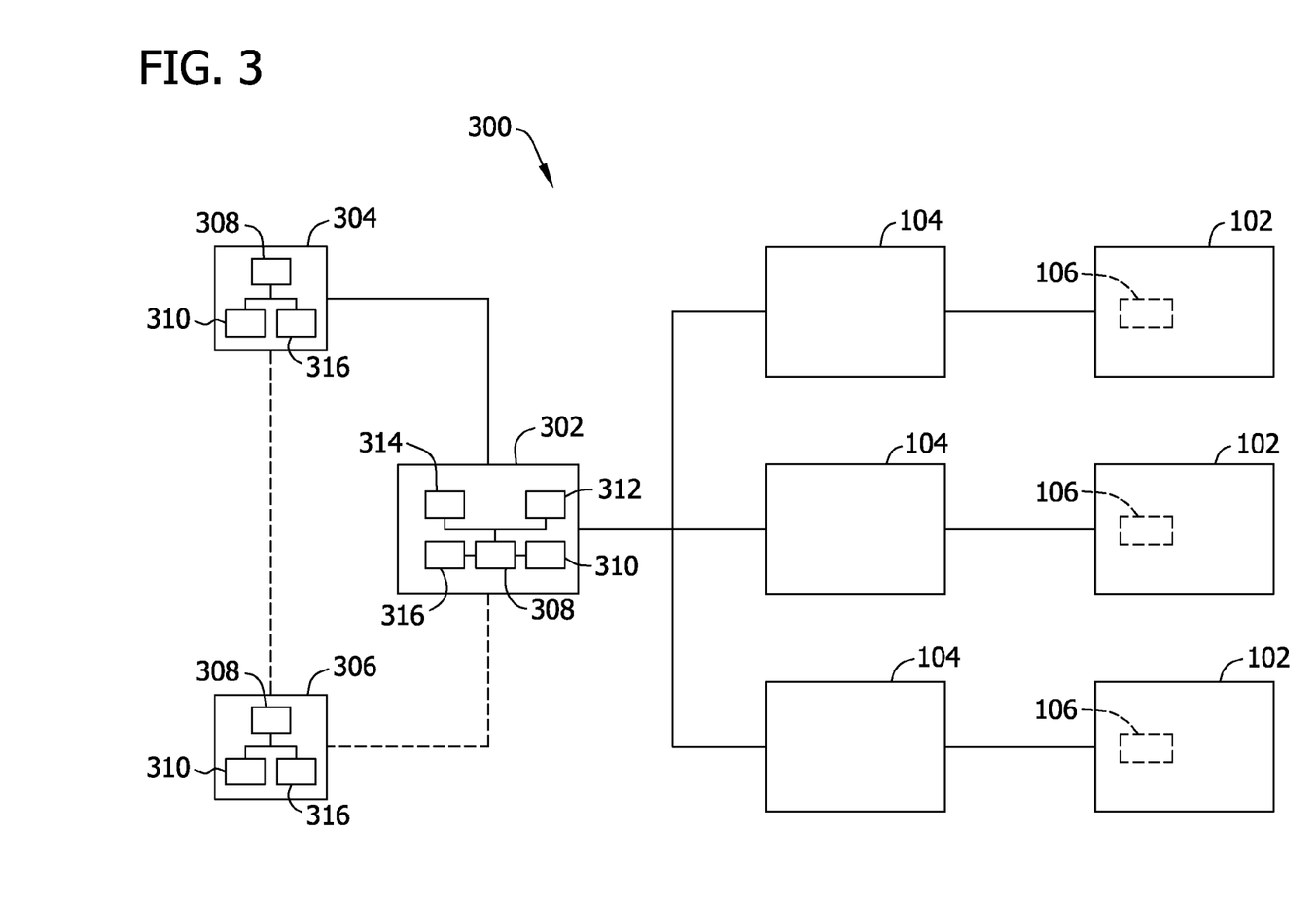
FIG. 3 is a block diagram of an exemplary charging system that may be used with the charging device shown in FIG. 2.

FIG. 3 is a block diagram of an exemplary charging system 300 for use in charging, i.e., supplying electrical current to, one or more power storage devices. In an exemplary embodiment, charging system 300 includes a plurality of charging devices 104 that supply current to a plurality of power storage devices 106 of one or more electric vehicles 102.

In an exemplary embodiment, charging system 300 includes a kiosk 302 communicatively coupled to one or more charging devices 104. Kiosk 302 is communicatively coupled to a payment processing system 304 and/or to a server 306. In an exemplary embodiment, server 306 selectively enables and disables communication between charging devices 104 and kiosk 302 based on whether one or more predetermined conditions are satisfied or met.

In an exemplary embodiment, kiosk 302 and charging devices 104 are positioned within a parking structure or within a parking lot. Charging devices 104 are positioned proximate to a plurality of parking spaces (not shown) and kiosk 302 is positioned proximate to one or more charging devices 104. Payment processing system 304 and server 306 are positioned remotely from the parking structure and/or parking lot. Alternatively, charging devices 104, kiosk 302, payment processing system 304, and/or server 306 may be positioned in any arrangement and/or location that enables charging system 300 to function as described herein.

Kiosk 302, in an exemplary embodiment, is a computer terminal incorporated within a stand, pedestal, or another structure (not shown) that enables a user to access kiosk 302. In an exemplary embodiment, kiosk 302 includes at least one processor 308, at least one memory device 310, at least one user input device 312, at least one display 314, and at least one communication interface 316.

Processor 308 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 310 includes a computer readable storage medium, such as, without limitation, random access memory (RAM), flash memory, a hard disk drive, a solid state drive, a diskette, a flash drive, a compact disc, a digital video disc, and/or any suitable memory. In an exemplary embodiment, memory device 310 includes data and/or instructions that are executable by processor 308 (i.e., processor 308 is programmed by the instructions) to enable processor 308 to perform the functions of kiosk 302 described herein.

User input device 312 includes, without limitation, a keyboard, a keypad, a touch-sensitive screen, a mouse, a scroll wheel, a pointing device, an audio input device employing speech-recognition software, and/or any suitable device that enables a user to input data into kiosk 302. Display 314 includes, without limitation, a liquid crystal display (LCD), a vacuum fluorescent display (VFD), a cathode ray tube (CRT), a plasma display, a light-emitting diode (LED) display, one or more LEDs, and/or any suitable visual output device capable of displaying graphical data and text to a user.

Communication interface 316 includes, without limitation, a network interface controller (NIC), a network adapter, a transceiver, a public switched telephone network (PSTN) interface controller, or any other communication device that enables kiosk 302 to operate as described herein. In an exemplary embodiment, communication interface 316 uses a wired Ethernet protocol and/or a wireless Ethernet protocol to enable kiosk 302 to communicate with charging devices 104, payment processing system 304, and/or server 306. Alternatively, communication interface 316 uses a power line communication protocol and/or any other suitable protocol to communicate with charging devices 104, payment processing system 304, and/or server 306.

In an exemplary embodiment, payment processing system 304 and server 306 each includes at least one processor 308 and at least one memory device 310. In addition, payment processing system 304 and server 306 each includes at least one communication interface 316 for use in communicating with each other and/or communicating with kiosk 302.

During operation, a user positions a power storage device proximate to charging device 104, for example, by parking an electric vehicle 102 proximate to charging device 104 such that a charging operation may be performed on power storage device 106 of electric vehicle 102. As used herein, the term "charging operation" refers to a transaction in which electrical current is supplied to power storage device 106, for example, by charging device 104.

The user accesses kiosk 302 through user input device 312 to determine whether one or more charging devices 104 are available for charging, as described more fully herein. The user selects a charging device 104 from a list of available charging devices 104 presented to the user by kiosk 302. The user also inputs a payment or a payment information for kiosk 302 to use to bill or charge the user for a cost of the charging operation. Kiosk 302 transmits data representative of the payment and/or payment information to payment processing system 304.

In an exemplary embodiment, payment processing system 304 authenticates the payment or the payment information and/or verifies whether sufficient funds exist in a payment or credit account of the user to pay an expected cost of the charging transaction. Payment processing system 304 transmits a payment authentication message to kiosk 302 if the payment or payment information is authenticated and if sufficient funds exist to pay for the charging operation.

When kiosk 302 receives the payment authentication message from payment processing system 304, kiosk 302 transmits a charging authorization message or signal to the selected charging device 104. Charging device 104 initiates the charging operation and current is supplied to power storage device 106. When charging device 104 completes the charging operation, the cost of the charging operation is determined by charging device 104 and is transmitted to kiosk 302. Alternatively, if the user prepaid for the charging operation as described below, charging device 104 does not transmit the cost of the charging operation to kiosk 302.

In an exemplary embodiment, kiosk 302 transmits the cost of the charging operation, along with the payment information entered by the user, to payment processing system 304 to charge the user (i.e., the user's account) for the charging operation cost. In one embodiment, kiosk 302 and/or charging device 104 also transmits the charging operation cost to server 306. Server 306 receives a receipt and/or data from payment processing system 304 indicative of an amount of money charged to the user for the completed charging operation. Server 306 verifies the accuracy of the payment charged by payment processing system 304 by comparing the amount of money charged with the cost of the charging operation. Server 306 notifies an owner and/or operator of charging system 300, the user, kiosk 302, payment processing system 304, and/or any other device or system if the payment charged does not equal the cost of the charging operation.

Figure 4:
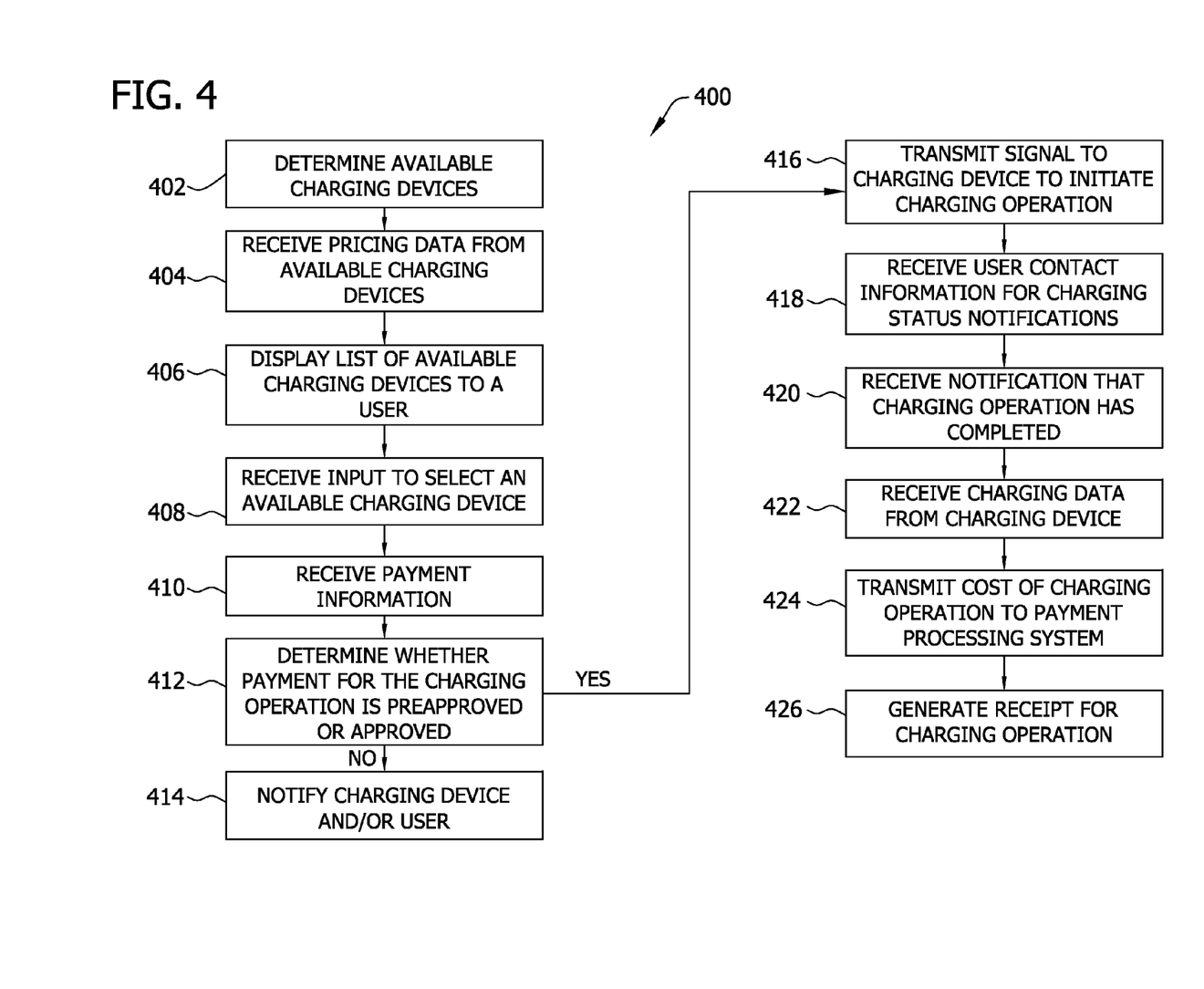
FIG. 4 is a flow diagram of an exemplary method of supplying current to a power storage device that may be used with the charging system shown in FIG. 3.

FIG. 4 is a flow diagram of an exemplary method 400 of charging, or supplying current to, a power storage device, such as a power storage device 106 of an electric vehicle 102 (both shown in FIG. 1), that may be used with charging system 300 (shown in FIG. 3). In an exemplary embodiment, method 400 is embodied within a plurality of instructions stored within memory device 310, and is at least partially executed by processor 308 of kiosk 302 (shown in FIG. 3).

In an exemplary embodiment, method 400 includes determining 402 charging devices 104 that are available (hereinafter referred to as "available charging devices 104") to perform a charging operation for a power storage device 106. More specifically, in an exemplary embodiment, a user manipulates user input device 312 of kiosk 302 to input a request to view available charging devices 104 within charging system 300. Kiosk 302 transmits a request to each charging device 104 coupled to kiosk 302 to determine whether each charging device 104 is available to perform a charging operation. Each charging device 104 transmits a response to kiosk 302 indicating the availability of charging device 104 (i.e., whether each charging device is available to perform the charging operation). If one or more charging devices 104 do not respond, kiosk 302 determines that the non-responsive charging devices 104 are unavailable.

In one embodiment, the transmitted request from kiosk 302 causes each available charging device 104 to be temporarily reserved or identified as unavailable to other kiosks 302 or other devices requesting to operate charging devices 104. Accordingly, a situation is facilitated to be prevented in which a first device (e.g., kiosk 302) identifies a charging device 104 as available, and a second device begins a charging operation using charging device 104 without the first device being notified of the newly unavailable status of charging device 104. In one embodiment, the temporary reservation of each available charging device 104 may expire after a predetermined amount of time elapses, and/or may expire upon receipt of a message from kiosk 302 that releases the reservation. For example, when a user selects one of the available charging devices 104, kiosk 302 transmits a message releasing the temporary reservation for all other (non-selected) charging devices 104.

Accordingly, kiosk 302 facilitates preventing a "race condition" between devices and/or users competing to access a charging device 104. For example, a race condition may occur as a result of a first user bypassing kiosk 302 to access a charging device 104 (e.g., using an RFID device, an NFC device, a second kiosk 302, or another payment or authentication device) while a second user attempts to access the same charging device 104 through kiosk 302. As used herein, the term "race condition" refers to a situation in which two or more devices are competing for a resource, such as charging device 104, and the device that accesses the resource first is able to use the resource, while the other device is prevented from accessing the resource. In one embodiment, a race condition may cause one device to erroneously indicate that the resource is available when the resource is being used by the other device.

In an alternative embodiment, the transmitted request from kiosk 302 does not cause each available charging device 104 to be temporarily reserved. Rather, the user selects an available charging device 104 and kiosk 302 transmits a message or signal to the selected charging device 104 to reserve only that charging device 104. However, if the selected charging device 104 becomes unavailable after the user has selected charging device 104, kiosk 302 notifies the user to select another charging device 104.

In an exemplary embodiment, kiosk 302 transmits a request to each charging device 104 to receive pricing data for a charging operation that each charging device 104 may perform. In an exemplary embodiment, each charging device 104 is programmed with pricing data for charging operations. More specifically, the pricing data for each charging device 104 is entered into server 306 by an owner or an operator of charging system 300, and server 306 transmits the pricing data to each charging device 104 within system 300. The pricing data includes, without limitation, a price per unit of time that the charging operation is executing and/or a price per unit of energy delivered by charging device 104, for example, to power storage device 106. In one embodiment, the pricing data also includes additional pricing rates based on a time-of-use billing program, based on peak demand pricing events, based on an identity of the user, and/or any other pricing structure that enables method 400 to function as described herein. The identity of the user may be determined by kiosk 302 based on a username and/or password entered through user input device 312, by receiving data from an RFID device, an NFC device, or another device, and/or by receiving any other identifying data that enables kiosk 302 to function as described herein. Additionally or alternatively, the identity of the user may be determined by charging device 104 in a similar manner as described with respect to kiosk 302.

In an exemplary embodiment, the pricing data for charging devices 104 may be different such that pricing data for a first charging device 104 is different from pricing data for a second charging device 104. For example, first charging device 104 may be positioned in a more desirable location than second charging device 104 such that the cost and/or price of the charging operation performed by first charging device 104 is higher than the cost and/or price of the charging operation performed by second charging device 104. In another example, first charging device 104 may be configured to perform the charging operation in a shorter amount of time than second charging device 104 such that the cost and/or price of the charging operation performed by first charging device 104 is higher than the cost and/or price of the charging operation performed by second charging device 104.

Kiosk 302 receives 404 the pricing data from the available charging devices 104 and displays 406 a list of the available charging devices 104 to the user on display 314. Kiosk 302 also displays the pricing data and/or an expected cost of a charging operation for each charging device 104 to enable the user to compare charging operation costs and/or prices of each charging device 104 before selecting a device 104. Kiosk 302 also enables the pricing data to be accepted (or rejected), for example, by displaying a prompt to the user on display 314 and enabling user input device 312 to receive user input representative of the acceptance or rejection of the pricing data.

Kiosk 302 receives 408 an input from the user to select an available charging device 104 from the list displayed 406. Kiosk 302 prompts the user to enter payment information for the charging operation, and receives 410 the payment information through user input device 312. Alternatively, the payment information may be received through communication interface 316 and/or through any other interface of kiosk 302.

In an exemplary embodiment, kiosk 302 determines 412 whether payment for the charging operation is preapproved, or approved as described below, based on the payment information. More specifically, in an exemplary embodiment, kiosk 302 transmits the payment information to payment processing system 304. Kiosk 302 also transmits an expected cost of the charging operation to payment processing system 304. Payment processing system 304 determines whether sufficient funds and/or credit is available in one or more accounts associated with the user to pay for the expected cost of the charging operation. If insufficient funds and/or credit exist for the expected cost of the charging operation, payment processing system 304 transmits a payment denial message to kiosk 302. In an exemplary embodiment, kiosk 302 notifies 414 the user and/or charging device 104 that the payment was denied. The user may then enter an alternate form of payment into kiosk 302. However, if sufficient funds and/or credit exists, payment processing system 304 transmits a payment preapproval message to kiosk 302.

In another embodiment, the user enters payment information into kiosk 302 to prepay for the charging operation. In such an embodiment, the user may select a duration for the charging operation, an amount of energy to be supplied to power storage device 106 from charging device 104, and/or an amount of money or credit to be used for the charging operation. Kiosk 302 determines 412 whether the payment information is approved for prepaying the cost of the charging transaction. More specifically, kiosk 302 transmits the payment information to payment processing system 304 to charge the cost of the charging operation, or to charge an amount identified by the user, to one or more accounts of the user. If the payment is approved by payment processing system 304, kiosk 302 determines the amount of energy to be supplied to power storage device 106 and/or the duration of the charging operation and notifies charging device 104 of the amount of energy to supply and/or the duration of the charging operation. Charging device 104 initiates the charging operation as described below.

In an exemplary embodiment, if the pricing data has been accepted, and if the payment information has been preapproved or approved, kiosk 302 authorizes charging device 104 to initiate the charging operation. More specifically, if kiosk 302 receives the payment preapproval message or a payment approval message from payment processing system 304, kiosk 302 transmits 416 a signal to charging device 104 to initiate the charging operation. In one embodiment, kiosk 302 receives 418 user contact information to enable kiosk 302 to transmit updates or notifications to the user relating to a status of the charging operation. The user contact information may include an email address, a telephone number, and/or any other information that enables kiosk 302 to transmit status notifications to the user. In another embodiment, the user may also enter the user contact information to enable the kiosk 302 to notify the user if an unavailable charging device 104 becomes available.

Kiosk 302 receives 420 a notification from charging device 104 when the charging operation has completed or is stopped, and receives 422 data regarding the completed charging operation (hereinafter referred to as "charging data") from charging device 104. The charging data includes the cost of the charging operation, the duration of the charging operation, the amount of energy (e.g., current) delivered to power storage device 106, the pricing data, and/or any other data that enables method 400 to function as described herein.

In an exemplary embodiment, if the user did not prepay for the charging operation, kiosk 302 transmits 424 the cost of the charging operation to payment processing system 304 to enable the user to be billed for the cost of the charging operation. Kiosk 302 generates 426 a receipt for the completed charging operation and transmits the receipt to the user. The receipt includes the charging data for the completed charging operation, including the cost of the charging operation.

In one embodiment, server 306 verifies that the amount of money charged by payment processing system 304 for the charging operation is equal to the cost of the charging operation. More specifically, server 306 receives the receipt from kiosk 302 and/or receives the cost of the charging operation from charging device 104 and/or kiosk 302. In addition, server 306 receives, from payment processing system 304, the amount of money charged by payment processing system 304 for the charging operation. Server 306 compares the cost of the charging operation with the amount of money charged. If the cost of the charging operation is not equal to the amount of money charged, server 306 notifies the owner and/or operator of charging system 300, the user, kiosk 302, and/or payment processing system 304. In one embodiment, a transaction identifier (ID) is associated with each charging operation to facilitate coordinating data related to the charging operation between components of charging system 300, such as between charging device 104, kiosk 302, payment processing system, and/or server 306. As such, the transaction ID is transmitted along with the payment information, the charging data, and/or any other data, signal, or message related to the charging operation.

A technical effect of the systems, devices, and methods described herein includes at least one of (a) receiving, from a charging device, pricing data for a charging operation; (b) displaying pricing data; (c) enabling pricing data to be accepted; and (d) authorizing a charging device to initiate a charging operation if pricing data is accepted.

Exemplary embodiments of a charging system, a kiosk, and a method of supplying current to a power storage device are described above in detail. The charging system, kiosk, and method are not limited to the specific embodiments described herein, but rather, components of the system and/or kiosk and/or steps of the method may be utilized independently and separately from other components and/or steps described herein. For example, the kiosk may also be used in combination with other power systems and methods, and is not limited to practice with only the electric vehicle and/or charging device as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging system for use in supplying current to a power storage device, said charging system comprising:
   a charging device configured to be coupled to the power storage device to perform a charging operation; and
   a kiosk located remotely from said charging device, and communicatively coupled to said charging device, said kiosk configured to:
      transmit an availability request to said charging device to determine whether said charging device is available to perform the charging operation;
      receive an availability response from said charging device indicating that said charging device is available to perform the charging operation;
      reserve said charging device in response to the transmission of the availability request when said charging device is indicated as available
      receive pricing data for the charging operation from said charging device;
      display the pricing data;
      enable the pricing data to be accepted; and
      authorize said charging device to initiate the charging operation if the pricing data is accepted.

2. A charging system in accordance with claim 1, wherein said charging device is a first of a plurality of charging devices, said kiosk is configured to transmit the availability request to said first charging device and to a second of said plurality of charging devices.

3. A charging system in accordance with claim 2, wherein said kiosk is configured to reserve each of said first charging device and said second charging device that are available to perform the charging operation in response to the availability request.

4. A charging system in accordance with claim 3, wherein said kiosk is configured to release the reservation after a predetermined time has elapsed.

5. A charging system in accordance with claim 3, wherein said kiosk is configured to release the reservation of said second charging device in response to said first charging device being selected to perform the charging operation.

6. A charging system in accordance with claim 2, wherein said kiosk is configured to receive pricing data from said second charging device for performing the charging operation by said second charging device.

7. A charging system in accordance with claim 6, wherein said kiosk comprises a display for displaying the pricing data from said first charging device and the pricing data from said second charging device.

8. A charging system in accordance with claim 2, wherein said kiosk comprises a user input device for receiving an input from a user to select one of said first charging device and said second charging device to perform the charging operation.

9. A charging system in accordance with claim 8, wherein, when said first charging device is selected, said kiosk reserves said first charging device but does not reserve said second charging device.

10. A charging system in accordance with claim 1, wherein said kiosk is configured to accept payment information for the charging operation.

11. A charging system in accordance with claim 10, further comprising a payment processing system configured to:
    receive the payment information from the kiosk; and
    one of approve and preapprove payment for the charging operation based on the payment information received.

12. A charging system in accordance with claim 11, wherein said charging device is configured to transmit a cost of the charging operation to said kiosk after the charging operation terminates, said kiosk is configured to transmit the cost of the charging operation to said payment processing system for billing an account for the cost of the charging operation.

13. A charging system in accordance with claim 1, further comprising a server configured to selectively enable and disable communication between said charging device and said kiosk.

14. A charging system in accordance with claim 1, wherein the pricing data is based on an identity of a user that accesses one of said kiosk and said charging device.

15. A kiosk for use with a charging system including a charging device, said kiosk comprising:
    a processor programmed to:
       transmit, using a communication interface coupled to said processor, an availability request to the charging device to determine whether the charging device is available to perform a charging operation, wherein the charging device is located remotely from said kiosk;
       receive an availability response from the charging device indicating that the charging device is available to perform the charging operation;
       reserve the charging device in response to the transmission of the availability request when said charging device is indicated as available;
       receive, from the charging device, pricing data for a charging operation;
       display the pricing data;
       enable the pricing data to be accepted; and
       authorize the charging device to initiate the charging operation if the pricing data is accepted.

16. A kiosk in accordance with claim 15, wherein the charging device is a first of a plurality of charging devices, said kiosk is configured to transmit the availability request to the first charging device and to a second of the plurality of charging devices.

17. A kiosk in accordance with claim 16, wherein said kiosk is configured to reserve each of the first charging device and the second charging device that are available to perform the charging operation in response to the availability request.

18. A kiosk in accordance with claim 17, wherein said kiosk is configured to release the reservation after a predetermined time has elapsed.

19. A kiosk in accordance with claim 17, wherein said kiosk is configured to release the reservation of the second charging device in response to the first charging device being selected to perform the charging operation.

20. A kiosk in accordance with claim 16, wherein said kiosk is configured to receive pricing data from the second charging device for performing the charging operation by the second charging device.

21. A kiosk in accordance with claim 20, wherein said kiosk comprises a display for displaying the pricing data from the first charging device and the pricing data from the second charging device.

22. A kiosk in accordance with claim 16, wherein said kiosk comprises a user input device for receiving an input from a user to select one of the first charging device and the second charging device to perform the charging operation.

23. A kiosk in accordance with claim 15, wherein said kiosk is configured to accept payment information for the charging operation.

24. A method of supplying current to a power storage device, said method comprising:

- transmitting, using a communications interface communicatively coupled to a kiosk, an availability request to a charging device to determine whether the charging device is available to perform a charging operation, wherein the charging device is located remotely from the kiosk;
- receiving an availability response from the charging device indicating that the charging device is available to perform the charging operation;
- reserving, using a processing device, the charging device in response to the transmitting of the availability request when the charging device is indicated as available;
- receiving, from the charging device, pricing data for the charging operation;
- displaying the pricing data;
- enabling the pricing data to be accepted; and
- authorizing, using the processing device, the charging device to initiate the charging operation if the pricing data is accepted.

25. A method in accordance with claim 24, wherein the charging device is a first of a plurality of charging devices, said method further comprises determining whether the first charging device and a second of the plurality of charging devices are available to perform the charging operation.

26. A method in accordance with claim 25, further comprising:

- receiving pricing data from the second charging device; and
- displaying the pricing data received from the first charging device and from the second charging device.

27. A method in accordance with claim 25, further comprising receiving an input to select one of the first charging device and the second charging device to perform the charging operation.

* * * * *